United States Patent [19]

Raush

[11] 4,334,945

[45] Jun. 15, 1982

[54] METHOD AND DEVICE FOR SEPARATING PARTS FROM A STRIP OF MATERIAL

[75] Inventor: Russell G. Raush, Conestoga, Pa.

[73] Assignee: RCA Corporation, New York, N.Y.

[21] Appl. No.: 212,445

[22] Filed: Dec. 3, 1980

[51] Int. Cl.³ .............................................. B32B 31/16

[52] U.S. Cl. .................................. 156/344; 29/426.3; 29/822; 156/584; 198/345; 198/381; 225/24; 269/8; 271/18.1

[58] Field of Search .................... 29/426.3, 426.6, 819, 29/822; 83/651.1; 156/344, 345, 572, 584, 644; 221/212; 225/24; 226/5, 96, 196, 197, 198; 269/8; 271/18.1; 193/47; 198/344, 345, 381, 439

[56] References Cited

U.S. PATENT DOCUMENTS 3,033,741 5/1962 D'Amato et al. ............... 156/344 X 4,099,607 7/1978 Brennan et al. ...................... 198/341

4,255,216 3/1981 Conant et al. ................. 156/344 X

*Primary Examiner*—Edward C. Kimlin

*Assistant Examiner*—Robert A. Dawson

*Attorney, Agent, or Firm*—Eugene M. Whitacre; Dennis H. Irlbeck; Lester L. Hallacher

[57] ABSTRACT

A device for separating shadow masks from a strip of base material includes a conveyor upon which the strip moves. Two loading plates are arranged above the conveyor and press the strip against the conveyor. The loading plates are separated by a space which is angularly disposed with respect to the axis of the conveyor. A tensioned wire is arranged in the space and a magnet raises a fully etched portion of the shadow mask over the tensioned wire as the shadow mask enters the space. The tensioned wire thus shears the partially etched shadow mask from the strip of base material.

10 Claims, 3 Drawing Figures

*Fig.2*
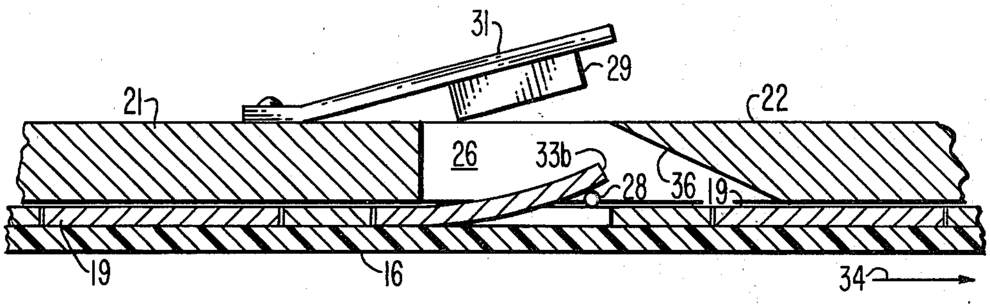
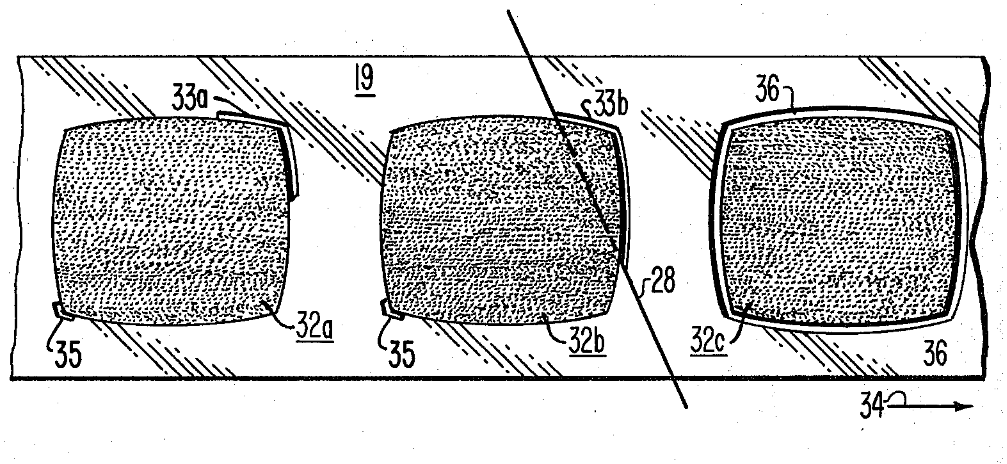
*Fig.3*

METHOD AND DEVICE FOR SEPARATING PARTS FROM A STRIP OF MATERIAL

BACKGROUND OF THE INVENTION

This invention relates generally to the separation of thin partially etched parts from a strip of base material and particularly to the separation of shadow masks for color television tubes from a strip of material.

In the most common technique presently employed in the manufacture of shadow masks for color television tubes a light gage steel strip is coated with a photoresist material. An aperture pattern and the periphery of the shadow mask are photographically applied to the photoresist which then is exposed to ultraviolet light and developed. The aperture pattern is completely etched through and the periphery of the shadow mask is completely etched through in some areas and partially etched through in other areas. The remainder of the photoresist material is then removed from the base material and the shadow mask remains attached to the strip of base material. The separation of the shadow mask from the strip of base material typically is accomplished by a manual operation in which the partially etched areas of the shadow mask periphery, known as the strip out line, are broken away.

This technique of removing shadow masks is satisfactory but suffers the disadvantage of being a manual operation. As a consequence, an unduely high percentage of the shadow masks are damaged and the manufacturing process is slowed because automatic separation is not used.

The instant invention overcomes these difficulties by providing the automatic separation of shadow masks from the strip of base material.

SUMMARY OF THE INVENTION

A device for separating partially etched parts from a strip of base material includes a conveyor for moving a strip of material in a direction parallel to the longitudinal axis of the strip. First and second loading means press the strips against the conveyor to cause the strip to be moved by the conveyor. The loading means are separated by a space which is angularly disposed with respect to the direction of motion of the strip. Arranged in the space is a shear means and means for raising a fully etched portion of the partially etched part to cause the part to pass over the shear means to fully remove the part from the strip of base material.

BRIEF DESCRIPTION OF THE DRAWINGS

FIG. 2 is a cross sectional view, partially broken away, taken along the longitudinal axis of the preferred embodiment of FIG. 1.

FIG. 3 is a top view of a strip of base material showing several shadow masks in various stages of production.

DETAILED DESCRIPTION OF THE PREFERRED EMBODIMENT

Figure 1:
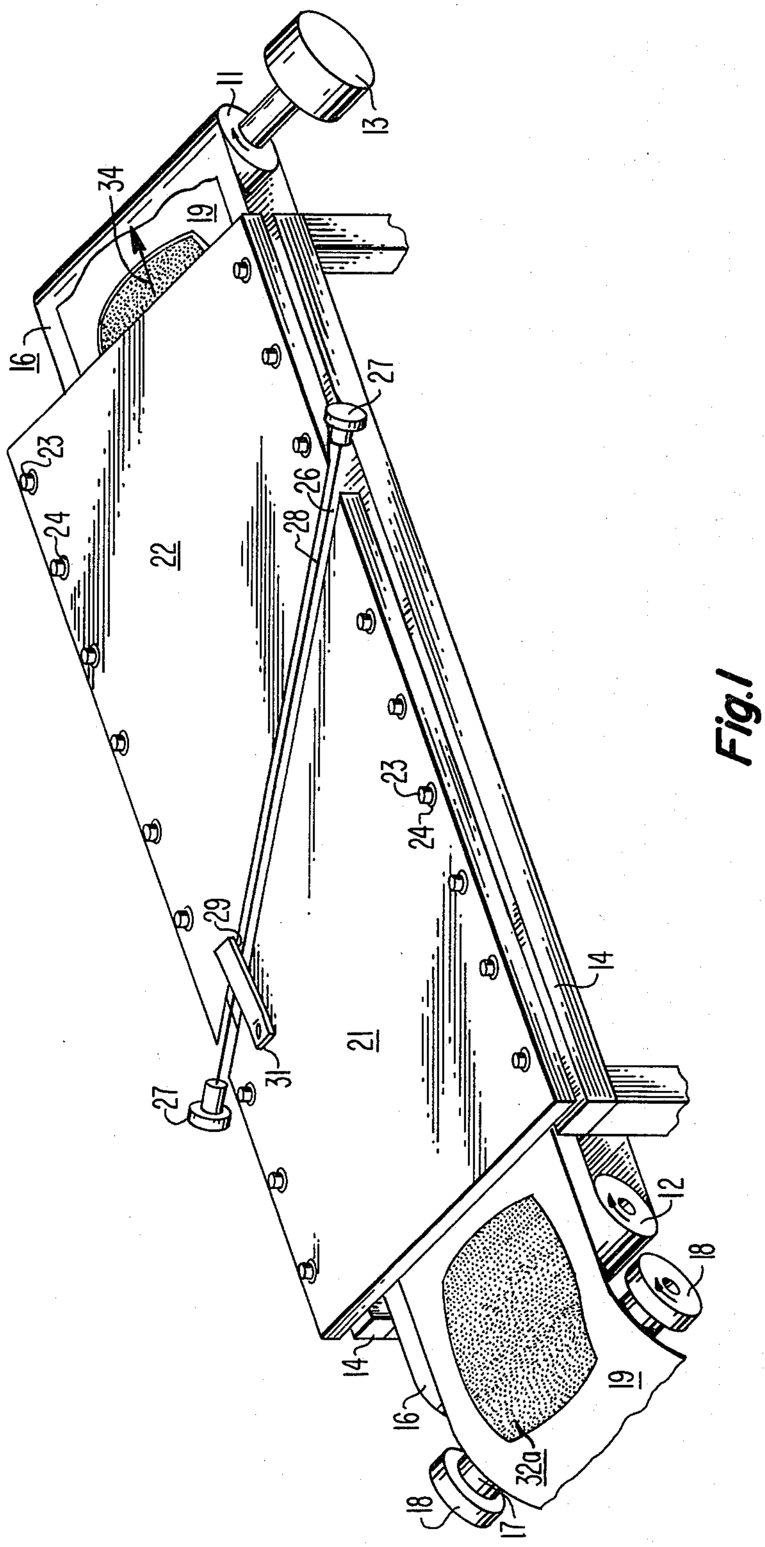
FIG. 1 is a perspective view, partially broken away, of a preferred embodiment of the instant invention.

In FIG. 1 a conveyor includes a drive pulley 11 and an idler pulley 12. The drive pulley 11 is driven by a gear or sprocket 13, which in turn is rotatably driven by an electric motor, a hydraulic motor or some other known type of device. The complete structural details of the drive and support mechanisms are not shown for simplicity as such details are within the purview of those skilled in the art and form no part of the instant invention. The drive pulley 11 and idler pulley 12 are rotatably supported by two longitudinal side bars 14 in any convenient manner. The side bars 14 are joined by a flat plate (not shown) to maintain a desired spacing of the side bars. Looped about the drive pulley, and the idler pulley 12 is a conveyor belt 16 composed of a high friction material, such as rubber. The belt 16 is slightly tensioned so that rotation of the drive pulley 11 causes the belt 16 to move longitudinally with respect to the side bars 14 in the direction indicated by the arrow 34. Another idler pulley 17 is arranged substantially parallel to and spaced from the idler pulley 12. The pulley 17 includes two guide discs 18 which are used to guide a strip of base material 19 onto the conveyor 16. A first loading plate 21 is arranged above the side bar 14 so that the conveyor belt 16 and the strip of base material 19 pass between the loading plate 21 and the flat plate which connects the side bars 14. A series of dowel pins 23 restrains the loading plate 21 from transverse and longitudinal movement with respect to the belt 16. The pins 23 are permanently inserted into the sidebars 14 and pass through a series of clearance holes 24 in the loading plate 21. The plate 21 therefore is free to move vertically on the pins 23 with respect to the belt 16 but is restrained from transverse and longitudinal movement. A second loading plate 22 is similarly restrained against transverse and longitudinal movement but is free to move vertically on another set of the dowel pins 23. The loading plates 21 and 22 are separated by a space 26 which extends across the entire transverse dimension of the conveyor belt 16 and which is angularily disposed with respect to the longitudinal axis of the belt 16. The material from which the strip 19 is made is quite light and therefore would be difficult to move and shear with the belt 16 alone. The weight of the loading plates 21 and 22 presses the strip 19 against the belt 16 with appreciable pressure and the strip 19 therefore is pulled along by the friction between the belt and the strip.

Tensioning devices 27 are arranged on opposite sides of the space 26 which separates the loading plates 21 and 22. A tensioned wire 28 is supported in the space 26 by the tensioning devices in an orientation which is substantially parallel to the space 26. The wire 28 is used to shear the partially etched portion of the shadow masks to separate the masks from the strip 19. The tensioning devices can be any of several types available, such as turn buckles, tapered pins, or threaded sleeves. The diameter of the wire 28 is selected to be sufficiently strong to withstand the pushing force of the material being sheared while being sufficiently small to shear the material. Typically shadow mask material is 0.006 inch thick (0.015 cm), thus a wire diameter of 0.04 inch (0.10 cm) would satisfy the requirements. Preferably, a piano wire having approximately this diameter would be used. A magnet 29, which can be an electromagnet but preferably is a permanent magnet, is supported directly above the space 26 and prior to the wire 28 by a mounting bracket 31. If desired the tensioning devices 27 can also vibrate the wire 28 along the longitudinal axis to add a sawing action to the wire.

FIG. 3 shows a strip of base material 19 including three shadow masks 32*a*, 32*b*, and 32*c* in different stages of production. The periphery of the first shadow mask 32*a* is partially etched away and a corner 33*a* is completely etched through the base material. The corner 35 which is diagonally across from the corner 33*a* also is fully etched through so that the wire 28 is not required to shear through a band of metal which is tangent to the wire as the final corner is approached. Additionally the corner 33*a* preferably is etched equally along the two sides of the shadow mask 32*a* so that equal shearing forces are present at all times. The second shadow mask 32*b* has progressed to the space 26 and thus the completely etched corner 33*b* has been raised by the magnet 29 so that the corner 33*b* passes over the tensioned wire 28. Accordingly, the longitudinal movement of the base material strip 19 causes the tensioned wire 28 to ride against the weakened partially etched periphery thereby separating the shadow mask section 32*b* from the strip 19. The third shadow mask 32*c* has been completely separated from the strip 19 by the tensioned wire 28 and has returned to the aperture 36 which was formed by the removal of the shadow mask.

As shown in FIGS. 2 and 3, in operation, the strip of base material 19 is moved by the conveyor belt 16 between the loading plates 21 and 22. The loading plates 21 and 22 exert pressure on the strip 19 to assure adequate friction between the strip and the belt. When the fully etched corner 36*b* of the shadow mask enters the space 26 the corner is raised by the magnet 29 and passes over the tensioned wire 28. The angular disposition of the tensioned wire 28 causes only two small edges of the shadow mask to be sheared free at any given instance. The required cutting force at the beginning and end of a shadow mask section is thus minimized and the required diameter of the tensioned wire 28 also is minimized. Preferably the wire 28 is disposed at a 45° angle with respect to the longitudinal axis of the conveyor. This assures that the wire 28 shears two equal points of the shadow masks and thus prevents unequal forces which could cause the strip 19 to move transversely. The angular disposition of the space 26 also helps assure that the freed shadow mask remains between the plates 21 and 22 and the belt 16 and does not rise above the plate 22 because the leading edge of the shadow mask is never parallel to the space so that a portion of the leading edge is always under one of the loading plates 21 or 22.

The sheared corner of the shadow mask passes over the tensioned wire 28 and encounters a beveled front edge 36 of the loading plate 22. The beveled edge 36 directs that the shadow mask between the loading plate 22 and the conveyor 16. The shadow mask thus returns to the aperture 36 which is formed in the base material 19 by the removal of the shadow mask. Accordingly, the separated shadow mask and the strip of base material 19 continue to travel together along the conveyor 16 and the sheared portion of the shadow mask assists in pulling the mask through the shearing operation.

The speed of the conveyor can be matched to the line speed of other sections of the assembly line so that the shadow mask is either fed onto another conveyor or automatically stacked. The scrap of the base material can be automatically removed to a different area.

What is claimed is:

1. A device for separating partially etched parts from a strip of base material comprising:

means for conveying said strip of base material in a direction parallel to the longitudinal axis of said strip;

first and second loading means arranged along said means for conveying, said strip of base material passing between said means for conveying and said loading means for conveyance by said means for conveying, said first and second loading means being separated by a space angularity disposed with respect to said longitudinal axis;

shear means arranged within and substantially parallel to said space; and magnet means for raising a portion of said etched part so that said raised portion passes over said shear means and said part is completely separated from said strip of base material.

2. The device of claim 1 wherein said shear means is a tensioned wire.

3. The device of claim 1 wherein said part is a shadow mask for a color television picture tube and said shear means is a tensioned wire.

4. The device of claim 1 wherein said first and second loading means are first and second plates arranged substantially parallel to the plane of said means for conveying.

5. The device of claim 4 further including means for constraining movement of said plates in a plane substantially parallel to said plane of said means for conveying.

6. The device of claim 5 wherein the edge of said second plate adjacent to said space is beveled.

7. The device of claim 6 wherein said angular disposition is different from 90°.

8. The device of claim 7 further including means for vibrating said tensioned wire along the longitudinal axis.

9. A device for separating shadow masks from a strip of base material comprising:

a conveyor for moving said strip in a direction parallel to the longitudinal axis of said strip;

first and second loading plates for pressing said strip against said conveyor and separated by a space angularly disposed with respect to said longitudinal axis;

a tensioned wire arranged in said space;

a magnet arranged in the proximity of said space for raising a portion of said shadow mask over said wire so that said wire separates said shadow masks from said strip.

10. A method of separating parts from a strip of thin material comprising the steps of:

providing a conveyor for moving said strip in a direction parallel to the longitudinal axis of said strip;

providing a first and second loading plate above and substantially parallel to said conveyor;

separating said plates by a space angularily disposed with respect to said axis;

providing a tensioned wire in said space;

providing a magnet in the proximity of said space; and feeding said strip between said conveyor and said first and second loading plates and raising a portion of said parts with said magnet to pass said parts over said tensioned wire to separate said parts from said strips.

* * * * *